United States Patent [19]

Banos et al.

[11] 4,346,741

[45] Aug. 31, 1982

[54] THREE-DIMENSIONAL WOVEN ARTICLES

[75] Inventors: Jean Banos, Merignac; Jean-Claude Cantagrel, Saint Aubin de Medoc; Georges Cahuzac; Jean-Louis Darrieux, both of Merignac, all of France

[73] Assignee: Societe Nationale Industrielle et Aerospatiale, Paris, France

[21] Appl. No.: 101,225

[22] Filed: Dec. 7, 1979

Related U.S. Application Data

[62] Division of Ser. No. 916,554, Jun. 19, 1978, Pat. No. 4,183,232.

[30] Foreign Application Priority Data

Jun. 20, 1977 [SE] Sweden ................................ 7718831

[51] Int. Cl.³ .............................................. D03D 3/02
[52] U.S. Cl. ............................................... 139/387 R
[58] Field of Search ................... 139/387 R, 388, 389, 139/13 R, 14, 16, 408; 66/9 R, 10, 11, 13, 125, 169, 190, 195

[56] References Cited

U.S. PATENT DOCUMENTS

| 3,749,138 | 7/1973 | Rheaume | 139/408 |
| 3,834,424 | 9/1974 | Fukuta | 139/22 |
| 4,001,478 | 1/1977 | King | 139/387 |
| 4,147,822 | 4/1979 | Kallmeyer et al. | 139/16 |

*Primary Examiner*—Henry Jaudon

[57] ABSTRACT

A three-dimensional weave is formed having a triple set of rods and yarns. The network of rods is placed about the generatrices of the body of revolution to be made and ordered regularly around the axis of the latter in coaxial layers of revolution and in successive radial bunches. Circumferential yarns and radial yarns are laid in helical courses and woven into said network of rods around the axis.

10 Claims, 4 Drawing Figures

U.S. Patent    Aug. 31, 1982    4,346,741
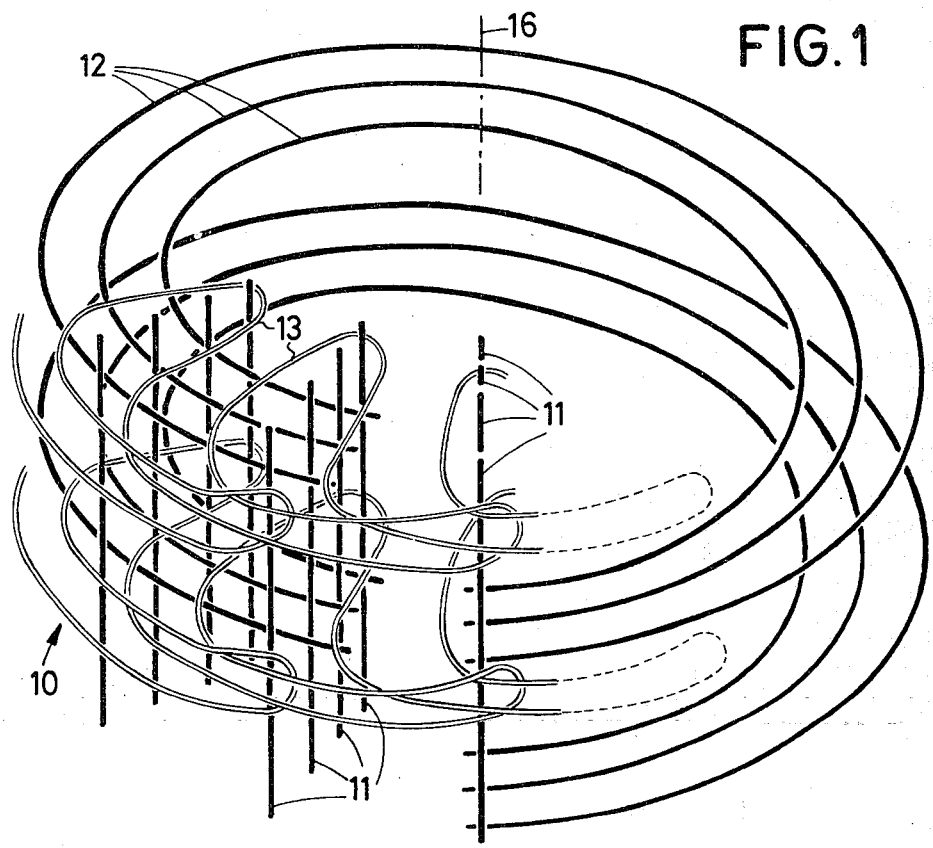
FIG.1
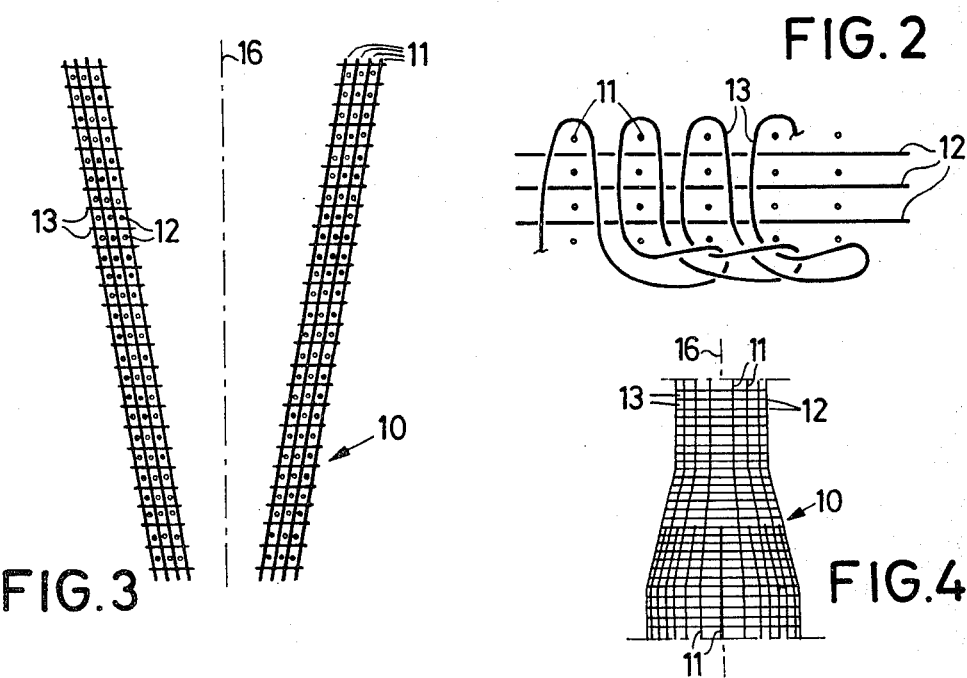
FIG.2
FIG.3
FIG.4

THREE-DIMENSIONAL WOVEN ARTICLES

RELATED APPLICATION

The present application is a division of U.S. Ser. No. 916,554 filed June 19, 1978, now U.S. Pat. No. 4,183,232 issued Jan. 15, 1980.

BACKGROUND OF THE INVENTION

The present invention relates to three-dimensional woven bodies of revolution having complex geometric shape.

Three dimensional woven bodies of revolution after impregnation with a hardenable resin binder and thereafter, machined to precisely desired dimensions have found notable use in ballistic missles and rockets.

In U.S. Pat. No. 3,904,464, a body of revolution is formed by simply winding resin impregnated yarns circumferential within an "urchin" of pins delimiting the longitudinal and circumferential path. Only simple geometric forms are possible and much gluing and hardening is required prior to machining.

A three dimensional body is shown in U.S. Pat. No. 3,834,424 but it is not woven.

French Pat. No. 73/14 956 describes the fabrication by three-dimensional weaving of hollow parts of revolution in which circumferential and radial yarns are layed through a network of longitudinal rods made of polymerized resin. Fabrication of parts of complex form cannot be made but only cylindrical or, with great difficulty, conical parts.

The prior art has, in addition to the indicated drawbacks, a drawback having to do with the quality of the parts obtained. This quality in fact depends directly on the fibre content of the woven parts and hence, on the tamping during weaving. In the prior art, this tamping is obtained either manually or by the binding force induced by the tension of the circumferential yarns used. Tamping by binding force varies with the winding diameter, resulting in variations in the thickness of the part. In addition, in the case of large thicknesses, the binding force decreases from the inside toward the outside of the part, thus leading to a woven material which is heterogeneous in its thickness. The binding force also has a tendency to change the diameter of the courses laid, and this results in the slipping and shifting of fibres, harmful to final product quality.

SUMMARY OF THE INVENTION

It is an object of the invention to remedy these drawbacks and to provide a woven hollow reinforcements of revolution capable of having a complex cylindro-conical form and having a high degree of packing without affecting the precision of the geometrical form and the quality of the products obtained.

According to the present invention, a three-dimensional weave is formed having a triple set of rods and yarns comprising, on the one hand, a network of rods placed about the generatrices of the reinforcement of revolution to be made and ordered regularly around the axis of the latter in coaxial layers of revolution and in successive radial bunches. Circumferential yarns and, finally, radial yarns, are laid in helical courses and woven into said network of rods around the axis.

According to the invention, these yarns are woven with rods at a fixed point in front of which the rods move while turning around the axis and at the level of which the rods are kept constantly in the suitable position and inclination with respect to the axis, determined by the geometrical shape desired for the reinforcement at the corresponding level, while the helical courses of yarns composing the already woven part of the reinforcement are made to move downward gradually along the rods and these courses are tamped by constantly pressing the upper courses—just woven—during the weaving in the direction of the lower course—first woven—supported at a gradually descending level.

Details of the method and apparatus by which the articles of the present invention are made are set forth in applicants co-pending application, Ser. No. 916,554, filed 6/19/78, now U.S. Pat. No. 4,183,232, issued 1/15/80.

The circumferential and radial yarns are laid and tamped in their final geometrical configuration and one obtains hollow structures offering a particularly dense, compact, rigid and geometrically precise wall. Weaving takes place at a fixed level at which are kept the rods and yarns in their final arrangement, which corresponds to the directions of a trirectangular trihedral. The circumferential yarns are laid in circumferential corridors which delimit the coaxial layers of rods, and the radial yarns in radial corridors which delimit the successive bunches of rods, the latter extending in the longitudinal direction perpendicular to those of the circumferential and radial yarns.

Advantageously, the circumferential yarns are simply unwound and laid without tension between the coaxial layers of rods, where they fall—owing to the rotation of the rod network—in helical turns forming successive flat courses without a binding force, while the radial yarns are formed by a chain-stitched yarn at the fixed point of the weaving, this chain-stitch enclosing by its loops the successive bunches of rods, forming by the parts of its loops located between said bunches of rods the radial yarns and falling in helical courses between the successive courses of circumferential yarns.

Hollow bodies of complex form, not only cylindrical but conical or cylindro-conical ones are possible. To prevent a zone having a diminishing shape (such as a conical zone flaring toward the bottom), the number of rods may be reduced in the narrowest region of the body. Thus, it is possible to produce woven hollow parts of a complex shape economically in series in an almost fully automatic manner.

BRIEF DESCRIPTION OF THE DRAWINGS

In the drawings:

FIG. 1 is a perspective view, greatly enlarged of a portion of a woven body of revolution made in accordance with the present invention;

FIG. 2 shows schematically in plan view the interlacing of various yarns and rods, constituting one portion of a course of the woven body of FIG. 1;

FIG. 3 is a cross-sectional view of smaller enlargement than FIG. 1 of a woven body of revolution, according to the present invention, and FIG. 4 is an elevational view in small dimension of a cylindro-conical body of revolution according to the present invention.

DESCRIPTION OF THE INVENTION

The figures show a three dimensional woven structural article in the form of a hollow body of revolution, generally depicted by the numeral 10. The body is constituted by the interlacing of three layers of yarns or rods along three tri-rectangular directions, namely, bunches of longitudinally directed rods 11 arranged along the generatrice of the body, circumferential layers of a first yarn 12 arranged along the circles centered on the axis 16 and radial layers of a second yarn 13 arranged along the thickness of the wall of the body 10. The circumferential yarn 12 and the succession of radial yarns 13, form superimposed courses which wind helically while filling the wall of the body.

The successive bunches of rods 11 are uniformly spaced about the axis 16 and the individual rods in each bunch are similarly uniformly spaced from each other in the radial direction so that they respectively lie in circumferentially spaced relation to the corresponding rod in the adjacent rod bunch. The spacing in both instances is very close so that a relatively dense wall in the circumferential and radial directions is obtained. The circumferential yarns 12 are preferably continuous and are respectively located between each of the radially spaced rods 11.

The radial yarns 13 are interwoven in a chain stitch with the rods 11 and circumferential yarns 12. The yarns 12 and 13 move down and are tightened so that their layers lie close to each other forming a dense wall in the direction of the longitudinal rods 11.

The first or circumferential yarn 12 is placed in position in an untensioned state to provide flat unstressed helical courses.

The rods 11 can be placed parallel to the central axis to provide a cylindrical body or inclined to the axis to provide a conical body. Various shapes can be formed by varying the distances between rod bunches during formation. The number of rod bunches can also be varied along the longitudinal axis whereby a body of revolution having a desired shape is formed. For example, the number of rod bunches can be reduced to provide a narrow or radially smaller section. Thus, the body can be made in a composite cylindro-conical form.

The embodiment of a particular cylindro-conical reinforcement in accordance with the preceding description can be extended to reinforcements of any complex cylindro-conical form. The transitions between cone and cylinder or cones with different apex angles are done in a similar manner by changing the position of the rods and by modifying the progressive movement of these rods and of the yarn feed.

It is even possible to consider the fabrication of reinforcements having curved generatrices by using nonlinear displacement principles. This variety of forms is possible essentially thanks to the modelling of the configuration of the rods constantly ensured by their expansibility at the wearing level.

The yarns used can consist of a single strand or multiple strands. In the latter case, it is preferable to guide each strand individually to lay it in the network of rods.

The longitudinal rods can be either, for example, rods of prepolymerized resin-fibre in which case they constitute, as was seen, the longitudinal filling of the material when the structure is woven, or metallic rods which, after weaving, are replaced, using any suitable system, by yarns which serve as longitudinal filling.

Further details of the present invention, particularly, the method by which the body of revolution is formed, the relationship of rods and yarns and the shapes and densities of the shape formed, can be found in the aforementioned U.S. Pat. No. 4,183,232, the disclosure of which is incorporated herein as if more fully set forth.

We claim:

1. A woven reinforced article formed as a hollow body of revolution having a thick wall formed by three-dimensional weaving comprising a triple set of rods and yarns comprising a plurality of rod-bunches circumferentially arranged about a central axis, each rod bunch having a plurality of elongated rods spaced along a common radius and respectively lying in circumferentially spaced relation to the corresponding rod in the adjacent rod bunch, a first substantially continuous yarn located to be between each of the adjacent radially-spaced rods forming superimposed courses of helically wound yarn; a second yarn extending radially between adjacent circumferentially spaced rod bunches intermediate each of said courses and being chain stitched to enclose the radially-spaced rods of each rod bunch between each of said courses of helically wound yarn.

2. The article according to claim 1, wherein the rod bunches are inclined relative to the central axis to shape the article.

3. The article according to claim 1, wherein said first substantially continuous yarn is in an untensioned state to provide flat helical courses thereof.

4. A three-dimensional woven structural article having the form of a hollow body of revolution with thick wall constituted by a triple set of rods and yarns intersecting at right angles, comprising a network of longitudinal rods disposed substantially parallel to the axis of the hollow body, said rods being disposed uniformly around said axis in coaxial layers of revolution and in successive radial bunches, circumferential layers of yarn in spiral turns around said axis located in the circular spaces separating the coaxial layers of rods, and radial yarn situated between the successive turns of the circumferential layers of yarn and between the successive radial bunches of longitudinal rods, said radial yarn being constituted by the branches of the loops of a yarn forming a chain stitch whereof the loops surround the successive radial bunches of rods.

5. The article according to claim 4 in which the set of circumferential and radial yarns have a dense and compacted texture in the direction of the longitudinal rods.

6. The article according to claim 4, in which the number of radial bunches of rods is reduced in the narrowest region of the article.

7. The article according to claim 4 in which the longitudinal rods are made of a composite fiber-resin material.

8. The article according to claim 4 in which the longitudinal rods are removable metal shafts and, when reinforced, are replaceable with yarn.

9. The article according to claim 4 wherein said circumferential yarn is formed of at least one continuous yarn arranged in a helical course.

10. The article according to claim 4 wherein said radial yarn is formed of at least one continuous yarn.

* * * * *